United States Patent [19]

Bardocz

[11] 4,033,539

[45] July 5, 1977

[54] OPTICAL RAIL SYSTEM

[76] Inventor: Arpad Bardocz, Rumannstrasse 57, 8 Munich 23, Germany

[22] Filed: Mar. 22, 1971

[21] Appl. No.: 126,562

[30] Foreign Application Priority Data

Apr. 3, 1970 Germany .......................... 2016067

[52] U.S. Cl. .................. 248/228; 403/387; 248/287
[51] Int. Cl.² ........................................ F16M 13/00
[58] Field of Search .......... 248/124, 228, 287, 466; 287/49, 51, 54.1, 189.35; 143/47 D

[56] References Cited

UNITED STATES PATENTS

| | | | |
|---|---|---|---|
| 591,620 | 10/1897 | Buchanan | 287/189.35 |
| 656,275 | 8/1900 | Streeter | 287/189.35 |
| 1,077,812 | 11/1913 | Derbyshire | 72/456 |
| 1,232,565 | 7/1917 | Karn | 248/228 X |
| 1,285,628 | 11/1918 | Craley | 143/47 D X |
| 1,831,798 | 11/1931 | Alsaker | 248/228 |
| 1,983,670 | 12/1934 | Knight | 248/228 |
| 2,124,006 | 7/1938 | Parker | 248/124 |
| 2,696,673 | 12/1954 | Kingman | 248/228 X |
| 2,763,931 | 9/1956 | McMillan | 248/228 X |
| 3,123,353 | 3/1964 | Schulze et al. | 248/466 |
| 3,412,966 | 11/1968 | Matson | 248/228 |

*Primary Examiner*—William H. Schultz
*Attorney, Agent, or Firm*—Edwin E. Greigg

[57] ABSTRACT

An optical rail system is provided in which the rails have top and bottom bearing surfaces and locating surfaces at about sixty degrees to the horizontal. The rails are clamped together at angles to each other and optical devices are secured to the rails by carriers. The clamping means and carriers have grooves with walls corresponding to the bearing and locating surfaces.

4 Claims, 10 Drawing Figures

INVENTOR:

OPTICAL RAIL SYSTEM

The invention concerns an optical rail system, in which each rail possesses a. at least two locating surfaces located symmetrically with respect to a longitudinal section and intersecting on the center line of the cross section plane, which are associated with demountable locking elements of optical carriers set upon the rails, and b. at least one bearing surface lying in a plane perpendicular to the above-mentioned longitudinal section and symmetrically intersecting the locating surfaces at their extreme limits away from the cross-section center, enabling the application of coupling parts holding two or more rails rigidly together.

Systems of optical rails in which two rails set at an angle to each other but lying in a common plane can be rigidly fastened together by a coupling part are already known —for example, the system of Hilger, or systems derived from this one. This means that although the rails are set at an angle to each other, they cannot be laid in parallel planes, the one rail crossing over the other, and then rigidly joined by coupling parts which have grooves of the type found on the optical carriers usually mounted on the rails. The reason for this is that all known optical rails (and in fact not only those of the Hilger system or systems derived from it, but also likewise known triangular rails) can be joined together only along a single direction; they cannot be joined making an angle to each other. Thus it would be possible to attach existing rails at an angle to each other and in two parallel planes, using special coupling parts; but in this case the coupling parts must be so designed that one of the rails, for example the lower one, is attached in a groove corresponding to the groove of an optical carrier while the other rail (in this example, the upper one) requires a demountable coupling of another type. This, however, would require a large number of special coupling parts, and is uneconomical, lacks in flexibility, and results in limited applicability of the whole system.

This invention proposes the creation of an improved arrangement for the rigid, demountable attachment of two rails which cross each other and lie in parallel planes, using a coupling part which joins and fastens to each of the two rails in the same way as the optical rail carriers are fastened to the rails. This is achieved (1) by providing each rail with an approximately X-shaped cross section, with two locating surfaces intersecting on the center line of the cross section, in addition to at least one additional bearing surface lying parallel to the usual optical carrier bearing surface, and (2) by providing the coupling part with two grooves, lying on opposite sides and running at an angle (preferably a right angle) to each other, each groove having a demountable locking element.

It is therefore a part of the invention that each rail is provided with two parallel bearing surfaces, with each of which is associated a pair of locating surfaces, so that either a coupling part as described in this invention or an optical carrier may be attached to either of two opposing sides of the rail. Thus two optical rails lying in parallel planes can be rigidly attached together at an angle, using a coupling part as described in this invention, whose grooves are like those of the optical carriers.

In the usual application of the rail, which (rail) constitutes the main part of the arrangement claimed in this invention, the rail is oriented with one bearing surface on top and the other on the bottom, with optical carriers or the coupling parts claimed in this invention being placed on the upper bearing surface, and with the lower bearing surface resting in the open groove of the coupling part claimed in this invention and located by the adjacent locating surfaces. However, this arrangement of the optical rails, in which the bearing surfaces lie in horizontal planes, represents only a preferred application. Quite generally, it is possible to orient the rails (with respect to their cross section) so that the two bearing surfaces make any arbitrary angle with the horizontal or vertical.

The invention is further described in terms of the accompanying illustrations:

Figure 1:
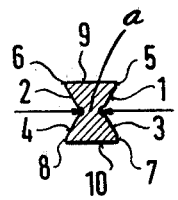
FIG. 1 shows in cross section a first example of execution of the optical rail claimed as a part of this invention.

In the following figures, parts in different species with the same function are provided with the same reference numbers and are distinquished only by an attached letter with, in some cases, a prime. The optical rail illustrated in FIG. 1 has an approximately X-shaped cross section with two pairs of flat locating surfaces, 1, 2 and 3, 4, intersecting at the middle of the vertical dimension of the cross section. The pair 1 and 2 and the pair 3 and 4 form two pairs of associated locating surfaces. Locating surfaces 1 and 2 intersect the flat bearing surface 9 at the edges 5 and 6, and similarly, locating surfaces 3 and 4 intersect the flat bearing surfaces 10 at edges 7 and 8, and the bearing surfaces 9 and 10 are parallel to each other. The bearing surfaces 9 and 10 do not intersect the locating surfaces 1, 2, 3, 4 directly to form sharp edges, the edges 5, 6, 7 and 8 actually being cut off to form short vertical or rounded surfaces. Similarly, the locating surfaces 1 and 3 and the locating surfaces 2 and 4 do not intersect directly to form an angle with a sharp reentrant edge; instead small grooves are formed at the locations where the surfaces 1, 3 and 2, 4 would intersect.

It will be noted also, as clearly shown in FIG. 1, that each locating surfaces 1, 2, 3, 4 forms an angle of 60° with the horizontal, that bearing surfaces 9 and 10 are equal in width and that the dimension $a$ of the narrowest part of the cross section between the side grooves is in the range of one third to one fourth of the width of the bearing surfaces 9 and 10. The rail, as indicated in the various perspective views, is, of course, of uniform cross-sectional dimension throughout its length.

Figure 2:
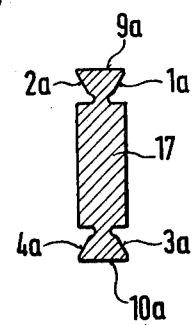
FIG. 2 shows in cross section a second example of execution of the optical rail claimed as a part of this invention.
Figure 3:
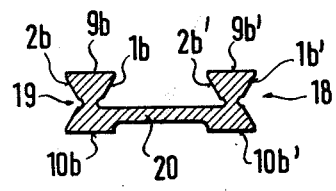
FIG. 3 shows in cross section a third example of execution of an optical rail claimed as a part of this invention.
Figure 4:
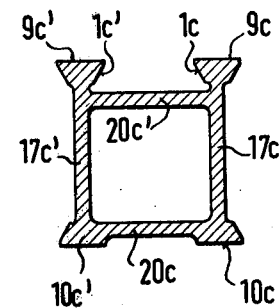
FIG. 4 shows in cross section a fourth example, in this case in the style of an optical bench with a large cross section, of execution of the optical rail claimed as a part of this invention.
Figure 5:
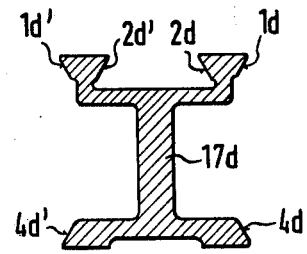
FIG. 5 shows in cross section a fifth example, in this case in the rails form of an optical bench, of execution of the optical rail claimed as part of this invention.
Figure 6:
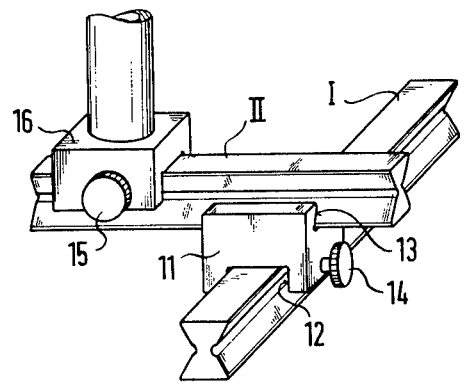
FIG. 6 shows in perspective a first basic form of the arrangement claimed in this invention for the coupling of two optical rails with a coupling part.
Figure 8:
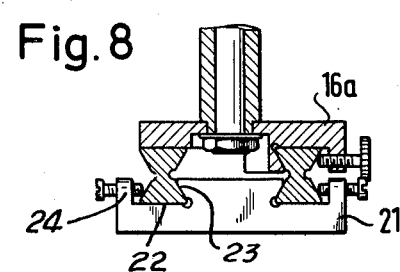
FIG. 8 shows in cross section a further example of the combination of two optical rails of the type shown in FIG. 1.

The basic proportions of the rail of FIG. 1 are maintained in the various other species shown in FIGS. 2, 3, 4 and 5 with the distinctions noted in the descriptions of those FIGURES and with the added distinction that interior bottom locating surfaces have been omitted in the species of FIGS. 3, 4 and 5. Optical rails of the type shown in FIG. rail can be joined, as shown in FIG. 6, with a coupling part 11 to form an arrangement claimed in this invention, where at least two optical rails I and II lie at right angles to each other. The coupling part 11 is provided with two grooves 12 and 13, having opposing sides (in this case, the grooves run at right angles to each other), and each groove is provided with a locking element, in this case a fastening screw 14. In FIG. 6 only a single fastening screw 14 is illustrated, since the other fastening screw, which locks the rail II into groove 13, is hidden. The associated optical carriers, e.g. the carrier 16 with the locking screw 15, can be placed on either of the rails I, II, at any position along the rail, even directly over the coupling part 11 at the junction of the optical rails I, II. The basic arrangement claimed in this invention, illustrated in FIG. 6, can be expanded in any desired way by using a number of optical rails of the type I, II and a corresponding number of coupling parts 11. The right angle between the rails, I, II in FIG. 6 is only as example; in fact, the rails can be set at any arbitrary angle by the proper choice of the angle between the grooves 12, 13 in the coupling part 11. The specific configuration of the grooves 12, 13 is best shown in other figures. For example, as shown in FIG. 8 each groove has a flat bottom wall 22 complementary to a bearing surface, a flat side wall 23 complementary to a locating surface and an upstanding wall 24 carrying the fastening screw 14. The end of the fastening screw bears against one locating surface and when it is screwed inwardly the wall 22 tightly engages a bearing surface, the wall 23 tightly engages a locating surface and the coupling part is clamped to the rail. As is evident all the coupling parts and carriers have the same groove configuration to clamp to the rails, although as seen by a comparison of FIGS. 8 and 10 in some cases a coupling or carrier may have a pair of parallel grooves to clamp onto two pairs of locating surfaces or a single groove bearing only on the outer locating surfaces.

In the execution of the optical rail shown in FIG. 2, the bearing surfaces 9a and 10a and their corresponding locating surfaces 1a, 2a, and 3a, 4a, respectively, are separated by a beam 17 running perpendicularly to the bearing surfaces. In this example, the thickness of the beam 17 is chosen equal to the width of the bearing surfaces 9a, 10a, so that the rail can be machined out of a single piece.

The optical rail shown in FIG. 3 is a double rail having the form of two rails 18, 19 of the type shown in FIG. 1, set side by side. Two opposing inner locating surfaces of the rails 18, 19 are rigidly joined to each other, thus forming a single piece, by the beam 20, which runs parallel to the bearing surfaces 9b, 9b', 10b, 10b'. The grooves of the coupling parts and optical carriers used with these rails may have either the width which corresponds to the total width of the rail illustrated in FIG. 3 or the width of one of the bearing surfaces 9b, 9b', 10b, 10b'. In addition, broad coupling parts and carriers may be used, which extend over two bearing surfaces in a single plans (e.g., 9b and 9b', or 10b and 10b'), but which have at least one dovetail groove by which the part attaches to only a single rail (e.g., 1b and 2b, or 1b' and 2b, or 1b' and 2b'). The optical carrier 16a, which is already well known, can be used for this purpose, as shown in FIG. 8. The optical carrier and coupling parts can also be shaped, with respect to their grooves, like the coupling part 21 illustrated in FIG. 8. Such coupling parts can also be used for the rigid, parallel coupling to two optical rails of the type shown in FIG. 1, as illustrated in FIG. 8. Similarly, optical rails of the type shown in FIG. 2 can be rigidly coupled parallel to each other by this coupling part.

The optical rail shown in FIG. 4 is a double rail, built as a parallel combination of two rails of the type shown in FIG. 2. Two vertically separated crossbeams 20c, 20c' lying parallel to the bearing surfaces 9c, 9c', 10c, 10c' connect into a single piece the two lower, inner locating surfaces, and the two beams 17c, 17c' oriented perpendicular to the bearing surfaces, respectively, thereby forming an optical bench of sufficiently large profile crossection to support heavy loads. The crossbeam 20c' connecting the beams 17c, 17c' in the example illustrated is attached closely adjacent to the opposing inner locating surfaces 1c, 1c', whereas the corresponding lower locating surfaces are removed by the crossbeam 20c.

The optical rail of FIG. 5 is a modification of the rail shown in FIG. 4, in which the two vertical beams (17c, 17c' in FIG. 4) are combined into a single vertical beam 17d, which is symmetrically located with respect to the six locating surfaces 1d, 2d, 1d', 2d', 4d, 4d'. This invention includes all of the many stable arrangements which can be built up with any or all of the types of optical rails shown in FIGS. 1–5 and the corresponding coupling parts and optical carriers, with wide or narrow mounting grooves, of which it was possible to illustrate only a few examples in this description.

Figure 7:
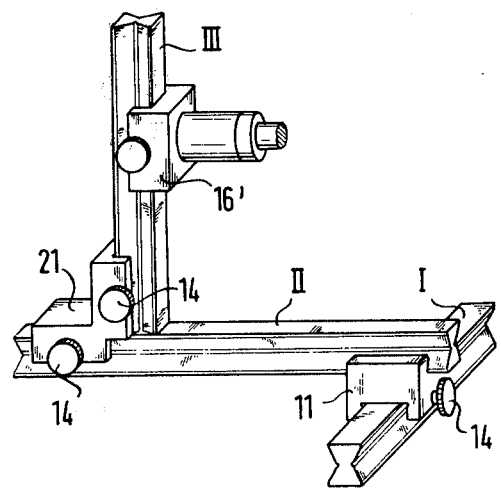
FIG. 7 shows in perspective a further example of the arrangement claimed in this invention, in this case a combination of three optical rails of the type shown in FIG. 6, and the associated coupling parts.

For example, it is possible, as shown in FIG. 7, to adapt the arrangement shown in FIG. 6 so that, by using a L-shaped coupling part 21 with mounting grooves and a tightening screw 14 as on the coupling part 11, an additional rail III of the type shown in FIG. 1 may be mounted upon rail II, so that an optical carrier 16' may be attached to rail III at any vertical position.

With the before-mentioned special coupling part 21, as shown in FIG. 8, two optical rails of the type shown in FIG. 1 can be set parallel to each other in the same plane and rigidly coupled together.

Figure 9:
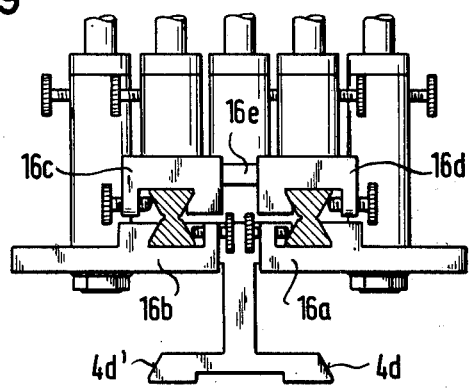
FIG. 9 shows in cross section a further example of the arrangement claimed in this invention, consisting of two optical rails of the type shown in FIG. 1, with associated coupling parts and carriers.

As shown in FIG. 9, two optical rails of the type shown in FIG. 1 can be combined, using special coupling parts, to form complicated arrangements of optical rails. In the example of FIG. 9, for example, five travelling optical carriers 16a, 16b, 16c, 16d, 16e are arranged to run parallel to each other.

The arrangement of FIG. 9 has the special advantage, claimed as part of this invention, that the optical carriers can be attached onto two opposing sides of each rail —in this example, the top and bottom sides. In the optical rail shown in FIG. 5, it can be seen that the bearing surfaces 4d, 4d' may be set into the mounting groove of a coupling part or of an optical carrier. When this possibility is extended to the example of FIG. 9, it is clear that it is possible to realize a very complicated three-dimensional array of optical rails running parallel or at angles to each other.

Figure 10:
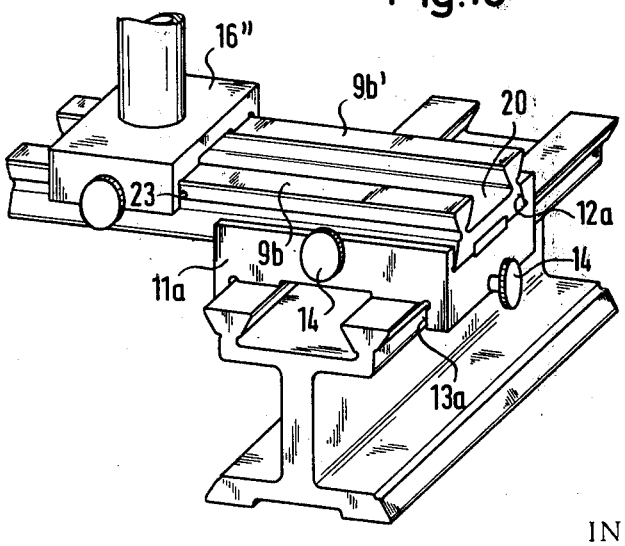
FIG. 10 shows in crossection a second basic form of the arrangement claimed in this invention, consisting of one optical rail of the type shown in FIG. 3 and one optical rail of the type shown in FIG. 5, with the associated coupling parts.

FIG. 10 shows a further arrangement, claimed as part of this invention, in which an optical rail of the type shown in FIG. 3 is rigidly attached at right angles with an optical rail of the type shown in FIG. 5, using a coupling part 11a with a broad mounting groove and a fastening screw 14. An optical carrier 16" with a broad mounting groove covers both upper bearing surfaces 9b, 9b' of the upper rail, which is of the type shown in FIG. 3. The coupling part 11a is provided with similar broad mounting grooves 12a and 13a, which couple with the bearing and locating surfaces of the lower part of the rail of the type shown in FIG. 3 and with the upper part of the rail of the type shown in FIG 5, respectively.

The invention is by no means limited to the illustrated examples of optical rail arrangements; indeed, by using at least two rails, which are not necessarily alike and which may be combined according to the examples of FIGS. 1-5, in combination with a large number of coupling parts and optical carriers, a practically unlimited number of arrangements is possible.

What is claimed is:

1. An integral optical rail comprising a uniform cross-sectional shape throughout its length, two spaced-apart top longitudinally extending flat bearing surfaces, a bottom longitudinally extending flat bearing surface parallel to said top surfaces, each of said top surfaces being equal in width and the overall widths of the top and bottom of the rail being equal, four flat locating surfaces on the sides of the rail, each locating surface extending towards a central plane of the rail perpendicular to the hearing surfaces from a line contiguous to the edge of a said bearing surface at an angle of substantially sixty degrees to the horizontal for cooperation with corresponding surfaces in grooves of couplings and optical carriers, said grooves also having surfaces for cooperating with the bearing surfaces, a fifth and a sixth flat locating surface each extending inwardly and towards an outer side of the rail from a line contiguous to an inner edge of a top bearing surface at an angle of substantially sixty degrees to the horizontal, plural portions of said rail cross-section in a plane parallel to the bearing surfaces narrowing to a width in the range of one third to one fourth of the width of a top bearing surface at two locations spaced from a central plane perpendicular to said bearing surfaces, and a horizontal web extending between regions contiguous to said locations.

2. An optical rail as claimed in claim 1, wherein said horizontal web includes spaced bottom flat bearing surfaces and the top of said web is in a horizontal plane contiguous to the middle of said rail.

3. An optical rail as claimed in claim 1, wherein a vertical web extends downwardly from each of said regions and a second horizontal web connects the bottoms of said vertical webs.

4. The optical rail as claimed in claim 1, wherein a vertical web extends downwardly from the central portion of said horizontal web and a second horizontal web is connected at its central portion to the bottom of said vertical web.

* * * * *